ROBBERY PROTECTION SYSTEM AND DEVICE FOR TEMPORARILY DISABLING A ROBBER AND VISIBLY MARKING HIS LOCATION

Original Filed Sept. 19, 1967 2 Sheets-Sheet 1

United States Patent Office

Re. 27,618
Reissued Apr. 17, 1973

27,618

ROBBERY PROTECTION SYSTEM AND DEVICE FOR TEMPORARILY DISABLING A ROBBER AND VISIBLY MARKING HIS LOCATION

Harold J. Robeson, 2104 Clairmont Terrace, Atlanta, Ga. 30345

Original No. 3,564,525, dated Feb. 16, 1971, Ser. No. 668,903, Sept. 19, 1967. Application for reissue Feb. 3, 1972, Ser. No. 223,344

Int. Cl. G08b *13/24;* H04b *7/00*

U.S. Cl. 340—224 11 Claims

Matter enclosed in heavy brackets [ ] appears in the original patent but forms no part of this reissue specification; matter printed in italics indicates the additions made by reissue.

ABSTRACT OF THE DISCLOSURE

The present invention relates to a robbery protection system and device for temporarily disabling and visibly marking the location of a robber after his departure from the robbed premises and includes a transmitter for emitting an electric field in the proximity of the escape path of the robber, and a dummy packet of currency having concealed therein a disabling and marking charge as well as means for activating said charge upon detection of said electric field.

BACKGROUND OF THE INVENTION

The present invention is intended for use by banking concerns and other establishments that retain considerable sums of money on the premises, thereby rendering them prime targets for planned robberies. The robbery protection system and device of the present invention is designed so that it will temporarily disable and visibly mark the location of a robber after his departure from the robbed premises. Since the disabling charge of the system is activated after the robber leaves robbed premises, the likelihood of the robber injuring innocent individuals held at bay during the robbery is greatly reduced.

Prior attempts have been made to develop robbery protection devices such as the devices disclosed by U.S. Pat. No. 1,923,979 issued to C. E. Howett. The disabling device disclosed by this patent is activated when pressure is exerted upon the packet. A further approach to a protection packet is disclosed in U.S. Pat. No. 2,041,577 that issued to C. R. Sutherland wherein the device is activated by an electric circuit which is energized upon the tilting of the packet during its removal from the cash depository. A still further approach is disclosed in U.S. Pat. No. 3,053,416 that issued to G. S. Harner wherein the device is activated through a timing means which, in turn, is activated by pressure being applied to a concealed activating button upon the removal of the packet from the cash depository.

In all of the above prior art devices, it is possible for the disabling charge to be activated on the robbed premises and in the presence of any individuals that may be held at bay by the robber. The activation of a disabling charge in such an instance could cause the robber to panic and kill or injure innocent individuals.

*None of the prior art devices utilized the dispersement of the chemical agent in non-explosive manner while utilizing a constantly emitting transmitter and an electrical time delay for commencing activation.*

SUMMARY OF THE INVENTION

The advantages of the present invention include a safety factor wherein there is no explosion to cause injury to innocent bystanders. Furthermore, if the packet is unintentionally picked up by a bank employee, it is not activated since it must be brought within the electric field that is disposed in the proximity of all of the exit paths of a robber. The protection packet so resembles actual currency by virtue of its flexibility, appearance, texture and weight that the robbed victim will not hesitate to turn it over to the robber.

The protection packet of the present invention also possesses ease of activation since picking up the packet will appear to be nothing more than picking up a regular packet of currency. There have been many instances with prior art devices when tellers handed out the hard tear gas devices and failed to activate them either because they forgot in the excitement to do so, could not find the button, or feared the pressing motion would be detected by the bandit. Some have just been afraid to press the arming button for fear the device would be activated in their presence.

The present device is also very effective since the dispersal of tear gas and smoke by non-explosive, non-flaming *burning* [buring] is the most effective means of dispersal. Since burning time is longer than the explosion time of a cartridge, a greater concentration of tear gas is maintained over a longer period of time especially when the wind tends to move the tear gas away from the emission point. The colored agent in the smoke will also attract attention. Using a limited departure time from the bank as the base time for activating the charge, the bandit can be detained in a limited area thereby enabling a more concentrated search.

The present device also provides for a long useful shelf life since the packet, being made of quality components and packaged in a stack of quality paper, will retain its outward appearance as well as its operativeness for an indefinite period of time. The only maintenance required is the replacement of the battery periodically.

The present invention is directed to a robbery protection system and device for temporarily disabling a robber after his departure from the robbed premises. A transmitter is employed for emitting a low frequency electric field in the proximity of the escape path of the robber. The frequency of the field that is emitted is lower than the frequency normally employed by radio and is higher than sixty cycle power transmission. The system further includes a dummy packet of currency having an outer appearance of superimposed layers of actual currency. The dummy packet is stored in the presence of the actual valuables retained on the premises. Concealed within the packet is a disabling means which includes a power source in the form of a direct current battery, and a sensing means for detecting a low frequency electric field and generating a signal therefrom. Furthermore, an amplifier is operatively connected to the power source and the sensing means and is constructed and arranged to amplify the signal generated by the sensing means. A frequency sensitive device is operatively connected to the amplifier for precluding any output signal from the amplifier that is of a frequency normally employed by radio or sixty cycle power transmission.

A current conversion means is further provided for converting the amplified signal into a direct current signal. Connected to the current conversion means is a means for receiving the current signal from the conversion means to initiate the activation of the disabling means. A timer is operatively connected to the initiating means for regulating the time delay of the final activation of the disabling means. An ignition means is operatively connected to the timing means that is activated by the timer after the predetermined selected time delay. Upon activation of the ignition means, a disabling charge made up of a mixture of smoke and tear gas powder is actively dispersed in the presence of the robber for temporarily disabling him after his departure from the robbed premises.

These and other features and advantages of the invention will be more clearly understood upon consideration of the following specification and accompanying drawings wherein like characters of reference designate corresponding parts throughout and in which:

These figures and the following detailed description disclose the specific embodiment of the invention, however, it is understood that the inventive concept is not limited thereto since it may be embodied in other forms.

DESCRIPTION OF ILLUSTRATIVE EMBODIMENTS

Figure 1:
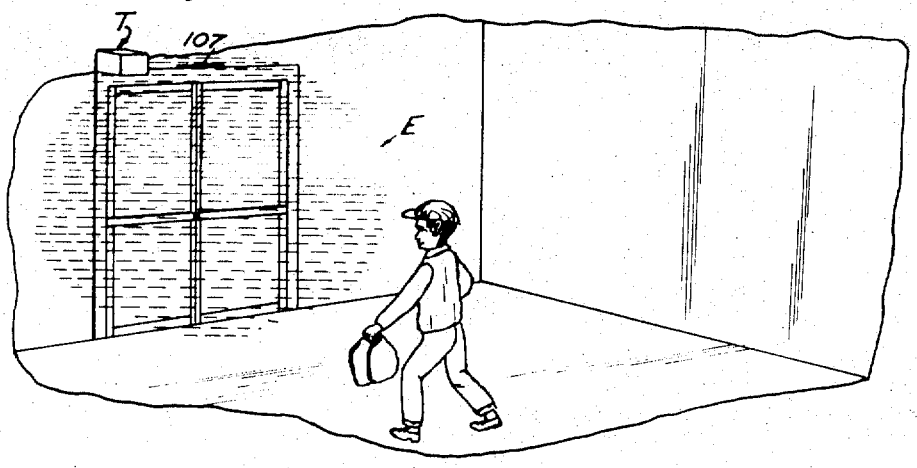
FIG. 1 is a perspective view showing the invention in use.
Figure 2:
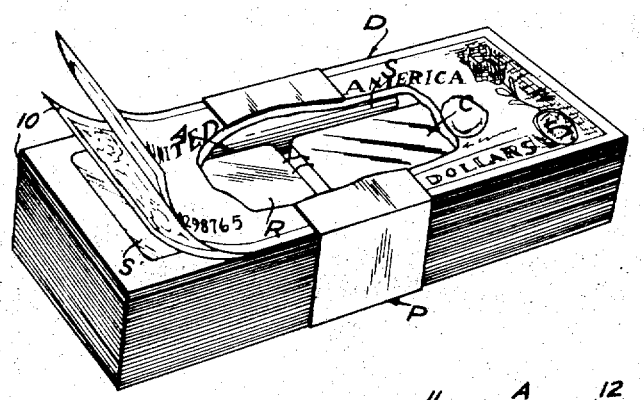
FIG. 2 is a perspective view of an embodiment of the disabling means of the invention partly broken away to show the activating means and the disabling charge carried therein.
Figure 3:
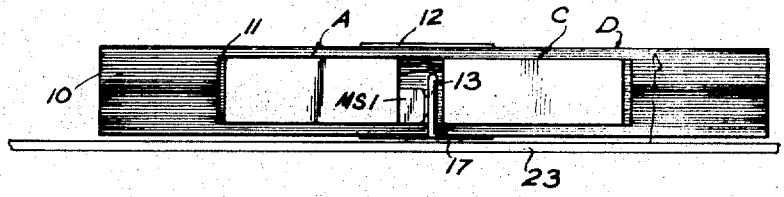
FIG. 3 is a cross-sectional view of the disabling means of the invention shown in FIG. 2.
Figure 4:
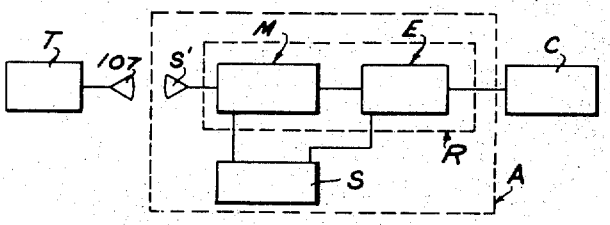
FIG. 4 is a block diagram illustrating one embodiment of the invention.
Figure 5:
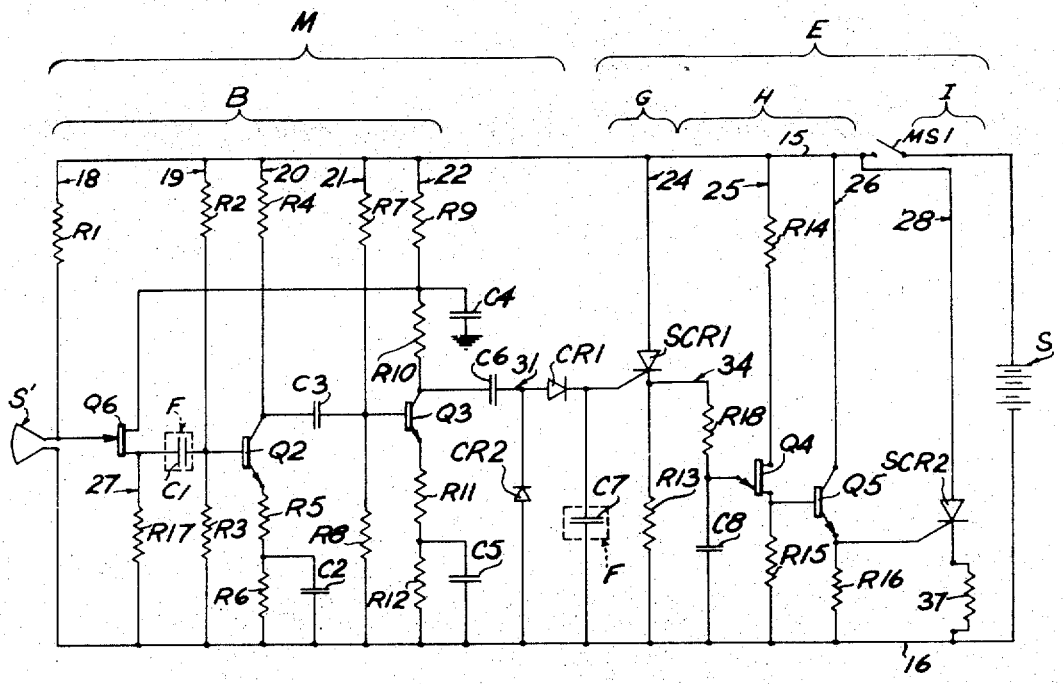
FIG. 5 is a schematic wiring diagram of the activation means of the invention.
Figure 6:
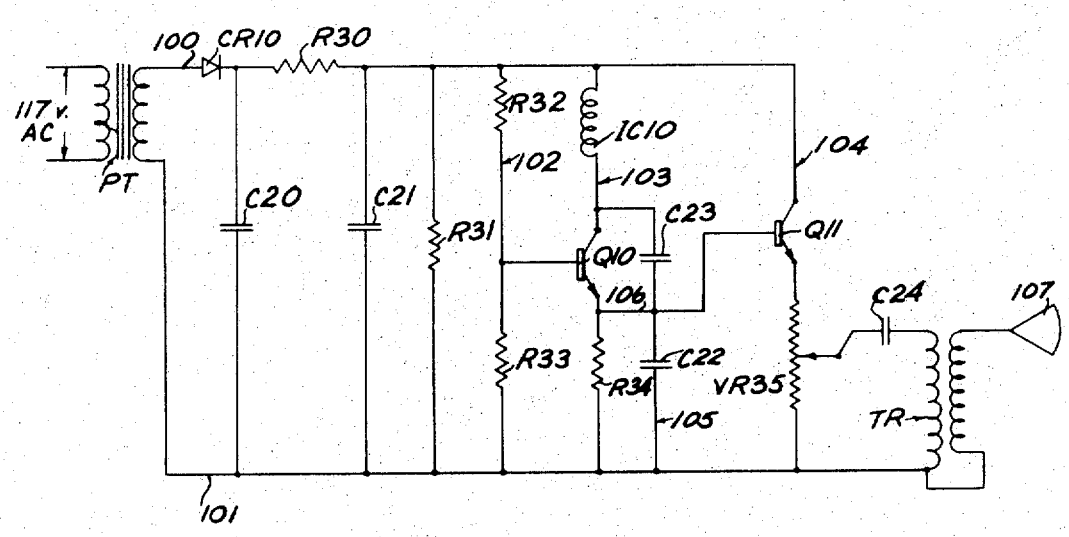
FIG. 6 is a schematic wiring diagram for the transmitter of the invention.

Basically, the invention includes a transmitter T for transmitting an electric field E of a predetermined frequency and a disabling means D which includes a dummy packet P housing therein an activating means A and a disabling charge C. The activating means A includes generally a power source S and a receiving means R having a timing element E and an amplifier M. This is best shown by FIGS. 2 and 4. The amplifier M includes a sensing means or antenna S', an amplifier circuit B and a safety means F and the timing element E includes a triggering circuit G, a timing circuit H, and an ignition circuit I.

The disabling charge C is a substance which will produce tear gas and preferably smoke when ignited by an electric match. Although a variety of such substances may be utilized, one substance that has been found satisfactory is a powdered mixture of sodium picrate, orthochlorobenzalmalonitrile and methylamenoanthroquinone which is manufactured by Northrup Carolina, Inc., a division of Northrup Corporation of California.

The dummy packet P includes a plurality of sheets 10 of fake currency with the center of the interior sheets 10 having a cut-out 11 therein for housing the activating means A and disabling charge C. To make the dummy packet P appear as a packet of real money, an actual piece of currency is placed on each side of the packet and a money band 12 is placed therearound.

The sensing means S' includes pieces of aluminum-foil placed between the external sheets 10 of fake currency and is connected to the amplifier circuit B. The power source S, which comprises a 9 volt direct current battery in this particular embodiment of the invention, is connected to a hot wire 15 through a microswitch MS1 on its positive side and connected to a ground wire 16 on its negative side which, in turn, is also connected to the amplification circuit B. The micro-switch MS1 is activated by a safety plug 13 which is inserted into the packet P through a hole 17 in the money band 12 and the sheets 10 of fake currency which communicate with the cut-out 11. The plug 13 is attached to the bottom 23 of a cash drawer in the premises and the packet is removed therefrom by lifting up the packet P during the robbery and depositing this packet P into the container used by the robber to carry away the loot. One side of the sensing means S' is connected to the hot wire 15 through a resistor R1 and the other side of the sensing means S' is connected directly to the ground wire 16. This forms the circuit branch 18.

Connected between the hot wire 15 and the ground wire 16 are resistors R2 and R3 forming the circuit branch 19 which is in parallel with the circuit branch 18. A circuit branch 20, in parallel with the circuit branches 18 and 19, includes resistor R4, junction transistor Q2, resistor R5 and resistor R6 in series. Circuit branch 21 is connected between hot wire 15 and ground wire 16 and in parallel with the circuit branches 18–20; and comprises resistors R7 and R8 in series.

A circuit branch 22 in parallel with the circuit branches 18–21 is connected between hot wire 15 and ground wire 16, and includes resistor R9, resistor R10, junction transistor Q3, resistor R11, and resistor R12 in series. Circuit branch 24 is connected between hot wire 15 and ground wire 16 in parallel with circuit branches 18–22, and includes a silicon controlled rectifier SCR1 and a resistor R13 in series. Circuit branch 24, in parallel with circuit branches 18–24, is connected between hot wire 15 and ground wire 16, and includes a resistor R14, a unijunction transistor Q4, and a resistor R15 in series. Circuit branch 26 is connected between hot wire 15 and ground wire 16 in parallel with circuit branches 18–25, and includes junction transistor Q5 and resistor R16 in series. Circuit branch 28 is connected between hot wire 15 and ground wire 16 in parallel with circuit branches 18–26, and includes a silicon controlled rectifier SCR2 in series with a spark ignition device 37 such as an Atlas match manufactured by Atlas Chemical Industries of Wilmington, Del.

Connected to the circuit branch 18 between resistor R1 and the sensing means S' and in parallel with the sensing means S' is a series circuit 27 of field effect transistor Q6 and resistor R17, the gate of the transistor Q6 being connected to the circuit branch 18 between the resistor R1 and the sensing means S' and the source being connected to the resistor R17. The drain of the transistor Q6 is connected to the circuit branch 22 between the resistor R9 and the resistor R10. A capacitor C1 is connected to the circuit branch 19 between the resistors [R1 and R2] *R2 and R3* and to the series circuit 27 between the transistor Q6 and the resistor R17.

In the circuit branch 20, the transistor Q2 has its emitter connected to the resistor R5 and its collector connected to the resistor R4. The base of the transistor Q2 is connected to the circuit branch 19 between the resistor R2 and the resistor R3. Connected to the circuit branch 20 between the resistors R5 and R6 and in parallel with resistor R6 is a capacitor C2 which is also connected to ground wire 16. A capacitor C3 connects circuit branch 20 between resistor R4 and transistor Q2 with circuit branch 21 between resistor R7 and resistor R8.

Transistor Q3 in circuit branch 22 has its emitter connected to resistor R11 and its collector connected to resistor R10. The base of transistor Q3 is connected to circuit branch 21 between resistors R7 and R8. Connected between ground wire 16 and circuit branch 22 between resistors R9 and R10 is capacitor C4; and connected between ground and circuit branch 22 between resistors R11 and R12 is a capacitor C5.

The silicon controlled rectifier SCR1 in circuit branch 24 has its anode connected to hot wire 15 and its cathode connected to R13. The gate of the rectifier SCR1 is connected to circuit branch 22 between resistor R10 and transistor Q3 through the series circuit 31 of a capacitor C6 and a certifier CR1 positioned so that current may flow toward the gate of the silicon controlled rectifier SCR1. Connected to the circuit 31 between the capacitor C6 and the rectifier CR1 is a rectifier CR2 which is also connected to ground wire 16 and positioned so that current will flow from ground wire 16 toward the circuit 31. Connected to circuit 31 between the rectifier CR1 and the gate of the silicon controlled rectifier SCR1 is a capacitor C7 which is also connected to ground wire 16. Connected to circuit branch 24 between the cathode of silicon controlled rectifier SCR1 and resistor R13 is a circuit branch 34 comprising a resistor R18 and a capacitor C8 in series, the other end of the circuit branch 34 being connected to the ground wire 16.

Transistor Q4 in circuit branch 25 has its base-one contact connected to resistor R15, its base-two contact connected to resistor R14 and its emitter connected to circuit branch 34 between resistor R3 and capacitor C8. Transistor Q5 in circuit branch 26 has its collector connected to hot wire 15, its base connected to circut branch 25 between transistor Q4 and resistor R15, and its emitter connected to resistor R16. The silicon controlled rectifier SCR2 has its anode connected to hot wire 15 and its cathode connected to the spark ignition device 37. The gate of the silicon controlled rectifier SCR2 is connected to the circuit branch 26 between the transistor Q5 and the resistor R16.

Circuit branches 18–22 are included in the amplifier circuit B and capacitors C1 and C7 comprise the safety means F. The capacitor C1 serves as the low frequency cut-off for the circuit B which is normally 3 to 5 kHz., and the capacitor C7 serves as the high frequency cut-off for the circuit B which is below the frequency range of HF and VHF signals. This bandpass characteristic was designed to prevent inadvertent activation of the receiving means R by 60 cycle frequencies and their harmonics which are produced by conventional electric power lines or from radio and television signals.

Circuit branch 24 is included in the triggering circuit G, circuit branches 25, 26 and 34 are included in the timing circuit H and circuit branch 28 is included in the ignition circuit I to form the timing element E.

The transmitter T includes a power transformer PT having the primary coil thereof connected to a conventional 117 volt A.C. power source. The secondary coil of the transformer PT is connected at one end thereof to a hot wire 100 and at the other end thereof to a ground wire 101. Connected between the hot wire 100 and the ground wire 101 is a capacitor C20 and interposed in the hot wire 100 between the point where the capacitor C20 is connected thereto and the secondary coil of the power transformer PT is a rectifier CR10 so positioned within the circuitry that current can flow along the hot wire 100 from the secondary coil of the transformer PT through the rectifier CR10 but cannot flow through the rectifier CR10 toward the secondary coil of the power transformer PT.

Connected between the hot wire 100 and the ground wire 101 is a capacitor C21 and a resistor R30 is interposed in the hot wire 100 between the point where the capacitor C20 is connected to the hot wire 100 and the point where the capacitor C21 is connected to the hot wire 100. This is the filter circuit for the power supply of transmitter T.

Connected between the hot wire 100 and the ground wire 101 is a resistor R31 which is in parallel with the capacitor C20 and C21. This resistor serves as the bias load for regulating the output from the filter circuit.

Connected between the hot wire 100 and the ground wire 101 is a circuit branch 102 which is in parallel with the resistor R31. The circuit branch 102 includes a resistor R32 and a resistor R33 in series. Connected between the hot wire 100 and the ground wire 101 is a circuit branch 103 which is in parallel with the circuit branch 102 and which includes an inductance coil IC10, a junction transistor Q10 and a resistor R34 in series. The transistor Q10 has its base connected to the circuit branch 102 between the resistor R32 and the resistor R33, has its collector connected to the inductance coil IC10 and has its emitter connected to the resistor R34. Connected between the hot wire 100 and the ground wire 101 is a circuit branch 104 in parallel with the circuit branch 102 and 103 and which includes a junction transistor Q11 and the fixed resistance of potentiometer VR35 in series. A circuit branch 105 is connected between ground wire 101 and the circuit branch 103 between the transistor Q10 and the inductance coil IC10. The circuit branch 105 includes a capacitor C22 and a capacitor C23 in series.

The base of the transistor Q11 is connected to the circuit branch 105 between the capacitor C22 and the capacitor C23 and a wire 106 connects the circuit branch 103 with the circuit branch 105 from a point on the circuit branch 103 between the transistor Q10 and resistor R34 and to a point on the circuit branch 105 between the capacitor C22 and the capacitor C23. The collector of the transistor Q11 is connected to the hotwire 100 and the emitter of the transistor Q11 is connected to the resistor VR35. This forms the oscillator circuit of the transmitter T.

One end of ground wire 101 is connected to the primary coil of a transformer TR, the other end of the primary coil being connected to the movable contact of the potentiometer VR35 through a capacitor C24. One end of the secondary coil of the transformer TR is connected to ground wire 101 and the other end of the secondary coil is connected to a transmitting antenna 107. The transmitting antenna 107 in this device is a single bar but may be changed as desired to meet each situation. The transformer TR and its associated circuitry serve to regulate the power output of the transmitter T.

The following values of components were found to produce satisfactory results:

RECEIVER

| | |
|---|---|
| R1=1,000,000 ohms | [Q1]*Q6*=2N4360 |
| R2=39,000 ohms | Q2=2N3900 |
| R3=12,000 ohms | Q3=2N3900 |
| R4=2,200 ohms | Q4=2N2646 |
| R5<560 ohms | Q5=2N3900 |
| R6=1,000 ohms | C1=0.005 μfd. |
| R7=39,000 ohms | C2=1.0 μfd. |
| R8=12,000 ohms | C3=1.0 μfd. |
| R9=820 ohms | C4=22 μfd. |
| R10=2,200 ohms | C5=1.0 μfd. |
| R11<560 ohms | C6=0.01 μfd. |
| R12=1,000 ohms | C7=0.1 μfd. |
| R13=560 ohms | C8=150 μfd. |
| R14=27 ohms | CR1=1N54A |
| R15=47 ohms | SCR1=C106Y2 |
| R16=1,200 ohms | CR2=1N54A |
| R17=3,600 ohms | SCR1=C106Y2 |
| R18≈330,000 ohms | |

TRANSMITTER

| | |
|---|---|
| R30=2,200 ohms, 1 watt | C22=0.0068 μfd. |
| R31=15,000 ohms, 1 watt | C23=0.01 μfd. |
| R32=22,000 ohms, ½ watt | C24=0.1 μfd. |
| R33=22,000 ohms, ½ watt | 1C10=100 μh. |
| R34=12,000 ohms, ½ watt | CR10=1N2070 |
| [35] *VR*35=2,000 ohms, 2 watts | Q10=2N3712 |
| C20=100 μfd., 200 v. | Q11=2N3712 |
| C21=100 μfd., 150 v. | |

The transmitter is tuned by adjusting the values of IC10, C23 and C22 and will usually vary from installation to installation. The values shown did produce a satisfactory operation at one particular location.

OPERATION

In operation, it will be seen that when the packet P is removed from the safety plug 13, the microswitch MS1 is closed thereby connecting the power source S with the amplifier circuit B. When the packet P is moved into the electric field E of the transmitter T, the sensing means S′ detects the field E and causes a signal to be sent to the amplifier circuit B wherein the signal is amplified while being passed through the safety means F which permits only signals having a band limited frequency range to pass therethrough and be transmitted to the timing element E.

The triggering circuit G receives the signal from the safety means F and transmits this signal to the timing circuit H. After a predetermined period of time, the timing circuit H causes a signal to be sent to the ignition circuit I which activates the spark ignition device 33 and ignites the disabling charge C to expel tear gas and colored smoke into the surrounding atmosphere.

More specifically, when micro-switch MS1 is closed and the sensing means S′ is placed in the electric field E, transistors [Q1], *Q6*, Q2 and Q3 amplify the detected signal which is alternating and then the voltage doubler formed by the capacitors C6 and C7, and the rectifiers [30] *CR1* and [32] *CR2* convert the amplified alternating current signal into direct current signal. As the signal is converted and the voltage level across the capacitor C7 rises, the trigger level of the silicon controlled rectifier SCR1 is reached causing the rectifier SCR1 to conduct. This causes the receiving means R to be triggered and since the resistance of resistor R13 is sufficiently small, conduction through the rectifier SCR1 is maintained even though the packet P is moved out of the electric field E.

The cathode circuitry of *SCR1 including* resistors R13 and R18 and the capacitor C8 is a current divider and causes the voltage across capacitor C8 to build up as the rectifier CR1 conducts. The time that is taken for the voltage across the capacitor C8 to reach the intrinsic standoff ratio voltage of the transistor Q4 is determined by the resistance of resistor R18 and can thus be varied by changing this resistance although a value of approximately 330,000 ohms has been found satisfactory.

When the voltage across the capacitor C8 reaches the intrinsic standoff ratio voltage of the transistor Q4, the transistor Q4 conducts and allows the voltage across the capacitor C8 to discharge through the resistor R15 and send a pulse of current to transistor Q5 which amplifies this current pulse. The amplified current pulse is imposed on the gate of the silicon controlled rectifier SCR2 and is sufficient to cause the rectifier SCR2 to conduct and ignite the spark ignition device 37. This ignites the disabling charge D and causes the charge D to emit tear gas and smoke.

In the operation, the transmitter T is constantly emitting a very low frequency electric field E so that the robber must carry the dummy packet P through this field to activate the activation means A and cause the disabling charge C to be ignited after a predetermined period of time. The oscillator circuit generates the output signal and the variable resistor VR35 can be adjusted to determine the power or size of the electric field to prevent inadvertent activation of the activation means A before the robber leaves the robbed premises. An electric field of frequency 8 kHz. has been found to be satisfactory to operate the invention.

Although specific embodiments of the invention have been described herein, it is to be understood that full use of modifications, equivalents, and substitutions may be resorted to without departing from the scope of inventive concept as set forth by the claims attached hereto:

What is claimed is:

1. A robbery protection device that is adapted to be energized by an electromagnetic field that is located in the escape path of a robber for temporarily disabling said robber after his departure from the robbed premises comprising:

(a) a dummy packet of currency;

(b) a thermally activated, oxidizable chemical agent concealed within said packet;

(c) means also concealed within said packet for activating said chemical agent after a selected time delay from detection of said electromagnetic field, *said means for activating said chemical agent including a receiving means for detecting an electromagnetic field and generating an output signal therefrom, an electronic time delay, and an ignition means for igniting said chemical agent upon receipt of the output signal generated by said time delay; and*

(d) said chemical agent being contained in said packet so that, when activated, it is dispersed in a non-explosive manner.

[2. A robbery protection device as claimed in claim 1 and further characterized in that said means for activating said charge includes a receiving means for detecting an electromagnetic field and generating an output signal therefrom, a time delay, and an ignition means for igniting said chemical agent upon receipt of the output signal generated by said time delay.]

3. A robbery protection device as claimed in claim [2] *1* and further characterized by a timing means operatively connected with said ignition means for regulating the time delay of the ignition of the chemical agent after receipt of the output signal from said receiver.

4. A robbery protection device as claimed in claim 3 and further characterized in that said disabling chemical agent includes a mixture of smoke and tear gas powder.

5. A robbery protection device as claimed in claim 4 and further characterized in that said activating means includes a power source and an amplifier operatively connected to said power source and said receiving means, amplifier being constructed and arranged to amplify the signal generated by said receiving means.

6. A robbery protection device as claimed in claim 5 and further characterized in that said activating means includes a current conversion means for converting said amplified signal into a direct current signal.

7. A robbery protection device as claimed in claim 6 and further characterized in that said activating means includes means operatively connected with said amplifier for precluding any output signal from said amplifier that of a frequency normally employed by radio and television and used in sixty cycle power transmission.

8. A robbery protection device as claimed in claim 1 and further characterized in that said disabling agent includes means for visibly marking the location of said robber after activation of said agent.

9. A robbery protection device that is adapted to be activated by an electromagnetic field as a robber departs from the robbed premises comprising:

(a) a dummy packet of currency; and (b) an agent concealed within said packet that is capable of visibly marking the location of the robber after activation by emitting a cloud of smoke and simultaneocsly staining the stolen property;

(c) said agent being contained in said packet so that, when activated, it is dispersed in a non-explosive manner;

[10. A robbery protection device as claimed in claim 9 and further characterized in that said agent is dispersed by a non-explosive, non-flaming burning process.]

11. A robbery protection system for temporarily disabling a robber after his departure from a robbed premises, said system comprising:

(a) a transmitter for emitting an electromagnetic field in the proximity of the escape path of the robber;

(b) a dummy packet of currency having an outer appearance of superimposed layers of currency;

(c) a disabling agent concealed within said packet;

(d) *Electrically responsive* means also concealed within said packet for activating said agent after a selected time delay from detection of said electromagnetic field; and (e) said agent being contained in said packet so that, when activated, it is dispersed in a non-explosive manner.

12. A robbery protection system for temporarily disabling a robber after his departure from a robbed premises, said system comprising:

(a) a transmitter for emitting a very low frequency electromagnetic field in the proximity of the escape path of the robber, said field being lower in frequency than those normally employed by radio and television and higher in frequency than those normally used in sixty cycle power transmission;

(b) a dummy packet of currency having an outer appearance of superimposed layers of currency that is normally stored in the presence of the actual valuables of said premises; and (c) a disabling means concealed within and carried by said packet, said disabling means including:

a power source, said power source being a direct current battery;

sensing means for detecting a low frequency electromagnetic field and generating a signal therefrom;

an amplifier, operative connected to said power source and said sensing means, said amplifier being constructed and arranged to amplify said signal generated by said sensing means;

means operatively connected with said amplifier for precluding any output signal from said amplifier that is of a frequency normally employed by radio and television and used in sixty cycle power transmission;

a current conversion means for converting said amplified signal into a direct current signal;

means operatively connected to said current conversion means for receiving said current signal from said conversion means to initiate the activation of said disabling means;

[a] *an electronic* timing means operatively connected to said initiating means for regulating the time delay of the final activation of said disabling means;

an ignition means operatively connected to said timing means and being activated by said timing means after said predetermined time delay; and a disabling agent made up of a mixture of smoke and tear gas powder operatively connected to said ignition means for actively dispersing smoke and tear gas in the presence of said robber after his departure from the premises.

*13. A robbery protection device that is adapted to be activated by an electromagnetic field as a robber departs from the robbed premises comprising:*

*(a) a dummy packet of currency;*

*(b) an agent concealed within said packet that is capable of visibly marking the location of the robber after activation by emitting a cloud of smoke and simultaneously staining the stolen property, said agent being contained in said packet so that, when activated, it is dispersed in a non-explosive manner; and*

*(c) an activating means, said activating means including a receiving means for detecting an electromagnetic field and generating an output signal therefrom, an electronic time delay, and an ignition means for igniting said agent upon receipt of the output signal generated by said time delay.*

*14. A robbery protection device as claimed in claim 13 and further characterized in that said agent is dispersed by a non-explosive, non-flaming burning process.*

References Cited

The following references, cited by the Examiner, are of record in the patented file of this patent or the original patent.

UNITED STATES PATENTS

| | | | |
|---|---|---|---|
| 1,284,155 | 11/1918 | Shartzer | 343—228 R UX |
| 2,041,577 | 5/1936 | Sutherland | 340—385 |
| 2,138,894 | 12/1938 | Ware | 325—361 UX |
| 2,411,787 | 11/1946 | Hammond, Jr. | 343—225 UX |
| 2,909,767 | 10/1959 | Zaltman | 340—276 |
| 3,032,651 | 5/1962 | Gisiger-Stahli et al. | 325—361 |
| 3,051,934 | 8/1962 | Lesher | 340—224 |
| 3,118,145 | 1/1964 | Nee | 343—225 |
| 3,160,869 | 12/1964 | Rambo | 343—225 X |
| 3,174,245 | 3/1965 | Martin | 340—280 UX |
| 3,257,653 | 6/1966 | McCorkindale | 340—224 |

FOREIGN PATENTS

| | | | |
|---|---|---|---|
| 3,424,122 | 1/1969 | Deangelis | 340—224 UX |

DONALD J. YUSKO, Primary Examiner

U.S. Cl. X.R.

325—37, 64; 340—283, 385; 343—228